United States Patent
Titus et al.

(10) Patent No.: US 12,060,113 B2
(45) Date of Patent: Aug. 13, 2024

(54) AERODYNAMIC DEPLOYABLE UNDERBODY STRAKES

(71) Applicant: Ford Global Technologies, LLC, Dearborn, MI (US)

(72) Inventors: Matthew Titus, Livonia, MI (US); Brett Peters, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 17/326,686

(22) Filed: May 21, 2021

(65) Prior Publication Data

US 2022/0371670 A1 Nov. 24, 2022

(51) Int. Cl.
*B62D 35/02* (2006.01)
*B62D 37/02* (2006.01)

(52) U.S. Cl.
CPC .............. *B62D 35/02* (2013.01); *B62D 37/02* (2013.01)

(58) Field of Classification Search
CPC ...................................... B62D 35/02
See application file for complete search history.

(56) References Cited

U.S. PATENT DOCUMENTS

| | | | | |
|---|---|---|---|---|
| 5,280,990 A * | 1/1994 | Rinard | ................ | B62D 35/001 296/180.1 |
| 8,731,781 B2 * | 5/2014 | Prentice | ................ | B62D 35/02 296/180.1 |
| 8,882,176 B2 | 11/2014 | Froling et al. | | |
| 9,752,718 B1 * | 9/2017 | Wittig | ................ | F16M 11/2042 |
| 9,764,615 B2 * | 9/2017 | Mosher | ................ | B62D 35/007 |
| 9,932,074 B2 | 4/2018 | Sarhadiangardabad | | |
| 10,029,746 B2 * | 7/2018 | Fahland | ................ | B62D 35/00 |
| 10,046,866 B2 * | 8/2018 | Lim | ................ | B64F 5/10 |
| 10,053,163 B1 * | 8/2018 | Del Gaizo | ................ | B62D 37/02 |
| 10,272,957 B2 * | 4/2019 | Klop | ................ | B62D 37/02 |
| 10,399,449 B2 * | 9/2019 | Jang | ................ | H02J 7/0042 |
| 10,589,804 B2 * | 3/2020 | Del Gaizo | ................ | B62D 35/007 |
| 10,676,140 B2 * | 6/2020 | Wolf | ................ | B60R 13/06 |
| 10,688,874 B2 * | 6/2020 | Kwasnick | ................ | H02J 50/10 |
| 10,768,074 B2 * | 9/2020 | Kasaiezadeh Mahabadi | ................ | G01M 17/04 |
| 10,814,922 B2 * | 10/2020 | Mandl | ................ | B62D 35/02 |
| 10,953,928 B2 * | 3/2021 | Angelo | ................ | B62D 9/00 |

(Continued)

FOREIGN PATENT DOCUMENTS

| | | | | |
|---|---|---|---|---|
| EP | 3533689 A1 | 9/2019 | | |
| GB | 2166393 A * | 5/1986 | ............ | B60B 15/26 |
| GB | 2578153 A * | 4/2020 | ............ | B62D 35/007 |

*Primary Examiner* — Jean Paul Cass
(74) *Attorney, Agent, or Firm* — Burr & Forman LLP; Lorne Forsythe (57) ABSTRACT

An aerodynamics control system for a vehicle may include an underbody shield disposed at an underside of the vehicle, a strake assembly, and an actuator. The strake assembly may include one or more deployable strakes operably coupled to the underbody shield and having a deployed state in which the one or more deployable strakes extend away from the underbody shield to increase drag and reduce lift of the vehicle. The strake assembly may also have a retracted state in which the one or more deployable strakes do not extend away from the underbody shield. The actuator may be operable by a driver of the vehicle while driving to transition the strake assembly from the retracted state to the deployed state.

20 Claims, 7 Drawing Sheets

(56) References Cited

U.S. PATENT DOCUMENTS

| | | | |
|---|---|---|---|
| 11,679,823 B2* | 6/2023 | Moradnia | B62D 35/02 296/180.1 |
| 2013/0238198 A1* | 9/2013 | Prentice | B62D 35/02 296/180.1 |
| 2017/0297637 A1* | 10/2017 | Shinedling | B62D 37/02 |
| 2018/0215424 A1* | 8/2018 | Marmo | B62D 29/007 |
| 2019/0111980 A1* | 4/2019 | Nakamura | B62D 35/02 |
| 2019/0342985 A1* | 11/2019 | Dadheech | H05H 1/2439 |
| 2020/0361545 A1* | 11/2020 | Nichols | B62D 35/02 |
| 2021/0291938 A1* | 9/2021 | Michaeli | B63B 27/143 |
| 2021/0347417 A1* | 11/2021 | Kron | B62D 35/001 |
| 2022/0297497 A1* | 9/2022 | Yamazaki | B60G 17/019 |
| 2022/0371670 A1* | 11/2022 | Titus | B62D 35/02 |
| 2023/0013812 A1* | 1/2023 | Moradnia | B60T 5/00 |
| 2023/0202588 A1* | 6/2023 | Matsui | B62D 37/02 296/180.5 |

* cited by examiner

AERODYNAMIC DEPLOYABLE UNDERBODY STRAKES

TECHNICAL FIELD

Example embodiments generally relate to vehicle aerodynamics and, more particularly, relate to controllable aerodynamic underbody strakes.

BACKGROUND

Vehicles, and especially high performance vehicles, often employ aerodynamic devices that are designed to improve aerodynamic performance. These aerodynamic devices are typically static. Because these aerodynamic devices are static, they may provide improved performance over only a limited set of vehicle conditions.

Thus, it may be desirable to develop aerodynamic devices that addresses some of the shortcomings discussed above.

BRIEF SUMMARY OF SOME EXAMPLES

In accordance with an example embodiment, an aerodynamics control system for a vehicle may be provided. The system may include an underbody shield disposed at an underside of the vehicle, a strake assembly, and an actuator. The strake assembly may include one or more deployable strakes operably coupled to the underbody shield and having a deployed state in which the one or more deployable strakes extend away from the underbody shield to increase drag and reduce lift of the vehicle. The strake assembly may also have a retracted state in which the one or more deployable strakes do not extend away from the underbody shield. The actuator may be operable by a driver of the vehicle while driving to transition the strake assembly from the retracted state to the deployed state.

In another example embodiment, a method of providing vehicle stability control to a vehicle having an strake assembly disposed on the vehicle is provided. The method may include receiving status information from components or a sensor network of the vehicle and receiving a mode selection between a first mode in which the strake assembly is in a retracted state, and a second mode in which the strake assembly is selectively transitioned between the retracted state and a deployed state. The method further includes determining, via a control algorithm, whether to transition the strake assembly between the retracted state and the deployed state based on the status information when the second mode is selected. The second mode may correspond to a normally deployed mode or a normally retracted mode, and the control algorithm may determine to retract the strake assembly from the normally deployed mode responsive to a retraction trigger, or to deploy the strake assembly from the normally retracted mode responsive to a deployment trigger.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some example embodiments may provide an improved system for aerodynamic control that includes deployable underbody strakes that are capable of being controlled to optimize drag, lift and other aerodynamic properties across various specific vehicle conditions. Since fixed strakes may only apply optimal control at specific speeds or driving situations, the use of deployable strakes can yield benefits in both customer confidence and vehicle capability with less compromise. As a result, vehicle performance and driver satisfaction may also be improved.

Figure 1:
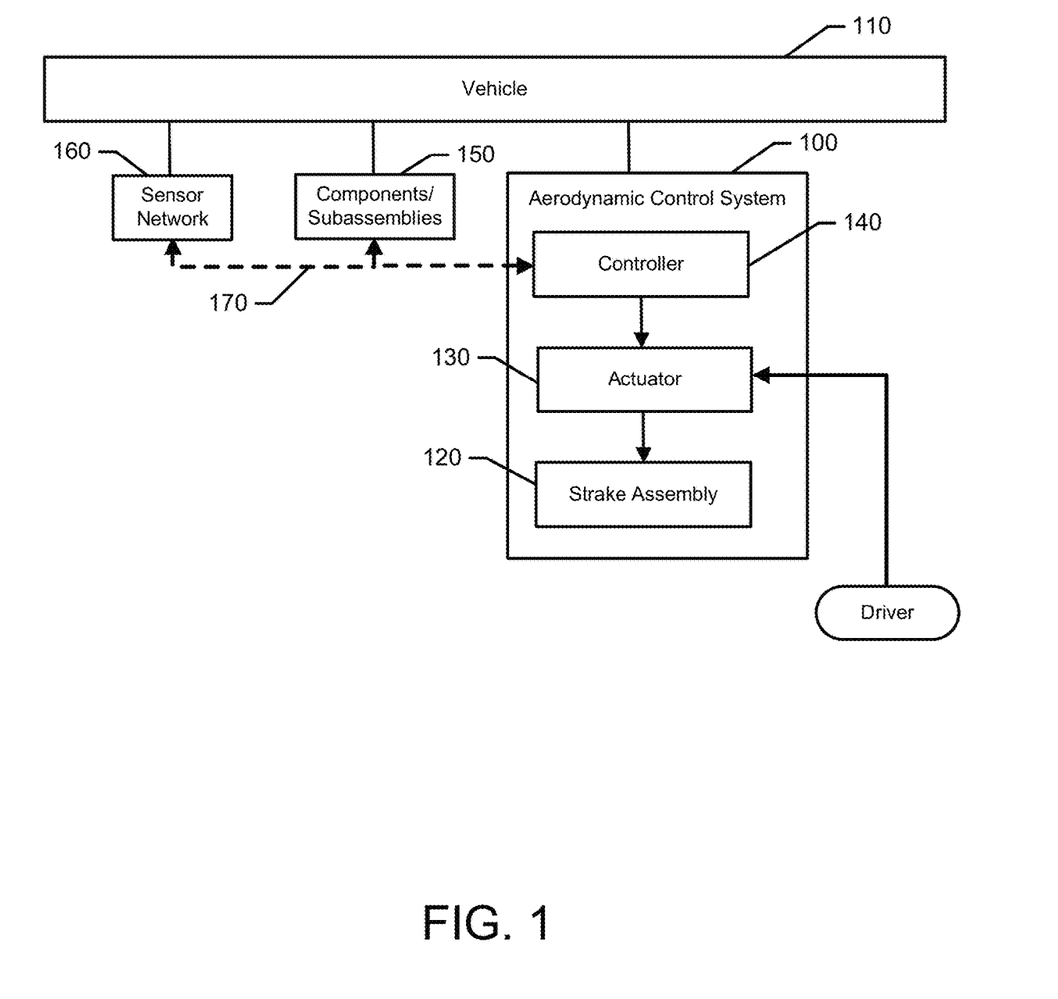
FIG. 1 illustrates a block diagram of a vehicle control system in accordance with an example embodiment.

FIG. 1 illustrates a block diagram of an aerodynamic control system 100 of an example embodiment. The components of the aerodynamic control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the aerodynamic control system 100 may be connected to the vehicle 110 via intermediate connections to other components either of the chassis or of other systems or components.

The aerodynamic control system 100 may include an aerodynamic device in the form of a strake assembly 120. The strake assembly 120 may include one or more individual strakes (or air guide members) that are movable between deployed (i.e., extended) and retracted (i.e., withdrawn or not extended) as described herein in order to change the state of the strake assembly 120 based on various conditions or information pertaining to vehicle status, and based on driver or operator control. Moreover, although not required, the strake assembly 120 of some embodiments may be deployable partially so that something less than full extension of the individual strakes may be accomplished.

The strake assembly 120 of example embodiments may be both deployable and dynamic. The "deployable" nature of the strake assembly 120 relates to the fact that the strakes of the strake assembly can be either deployed or retracted based on operator control. The "dynamic" nature of the strake assembly 120 refers to the fact that it is enabled to be dynamically repositioned responsive to real time conditions and status information to actively improve stability of the vehicle 110. Thus, for example, when the operator has deployed the strake assembly 120 (i.e., put the strake assembly 120 in the deployed state), the strakes thereof may generally be deployed or extended. However, various changes in conditions or vehicle status may dynamically cause the retraction of the strakes based on programmed rules or algorithms for control of the strake assembly 120.

In an example embodiment, the aerodynamic control system 100 may include a repositioning assembly (e.g., actuator 130), which may be provided as part of the aerodynamic control system 100 in order to reposition or move the strake assembly 120 under the control of a controller 140 (or control module) of the aerodynamic control system 100. In some cases, the controller 140 may be part of a vehicle dynamic module (VDM) or other control system of the vehicle 110 that is configured to perform other tasks related or not related to aerodynamic control or performance management. However, the controller 140 could be a dedicated or standalone controller in some cases. The operator (or driver) may either directly or indirectly control the actuator 130. Thus, although FIG. 1 shows the driver operating the actuator 130, it should be appreciated that such operation may be occurring indirectly via the controller 140.

In an example embodiment, the controller 140 may receive information that is used to determine vehicle status (or environmental conditions) from or associated with various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly and/or a wheel assembly of the vehicle 110. Sensors associated with the brake assembly may provide inputs such as brake pedal position, or brake pressure, to the controller 140. Sensors associated with the wheel assembly may provide information about vehicle speed, wheel angle, etc. Other sensors of the sensor network 160 that may be operably coupled to the brake assembly, the wheel assembly or other parts of the vehicle 110 may provide information relating to brake torque, brake torque rate, vehicle acceleration, individual wheel speeds/angles, etc. Other examples of the components or subassemblies 150 and/or corresponding sensors of the sensor network 160 may provide information relating to pitch, yaw, pitch rate, yaw rate, lateral G force, throttle position, selector button positions associated with chassis and/or vehicle control selections, etc. Thus, for example, the sensors may include an inclinometer, gyroscope, accelerometer, and/or the like. In some cases, the sensor network 160 may further include sensors for detecting weather conditions, road conditions or the like. For example, moisture sensors and temperature sensors may detect wet or icy roads. The sensor network 160 may also include a camera (or cameras) that operate in the visible light spectrum, infrared cameras, Lidar, and/or the like to detect debris or other obstacles or road conditions.

Accordingly, for example, the controller 140 may be able to receive numerous different parameters, indications and other information that may be related to or indicative of different situations or conditions associated with vehicle status. The controller 140 may then be configured to use the information received in association with the execution of one or more control algorithms that may be used to provide instructions to the actuator 130 in order to control a position of the strake assembly 120.

Figure 2:
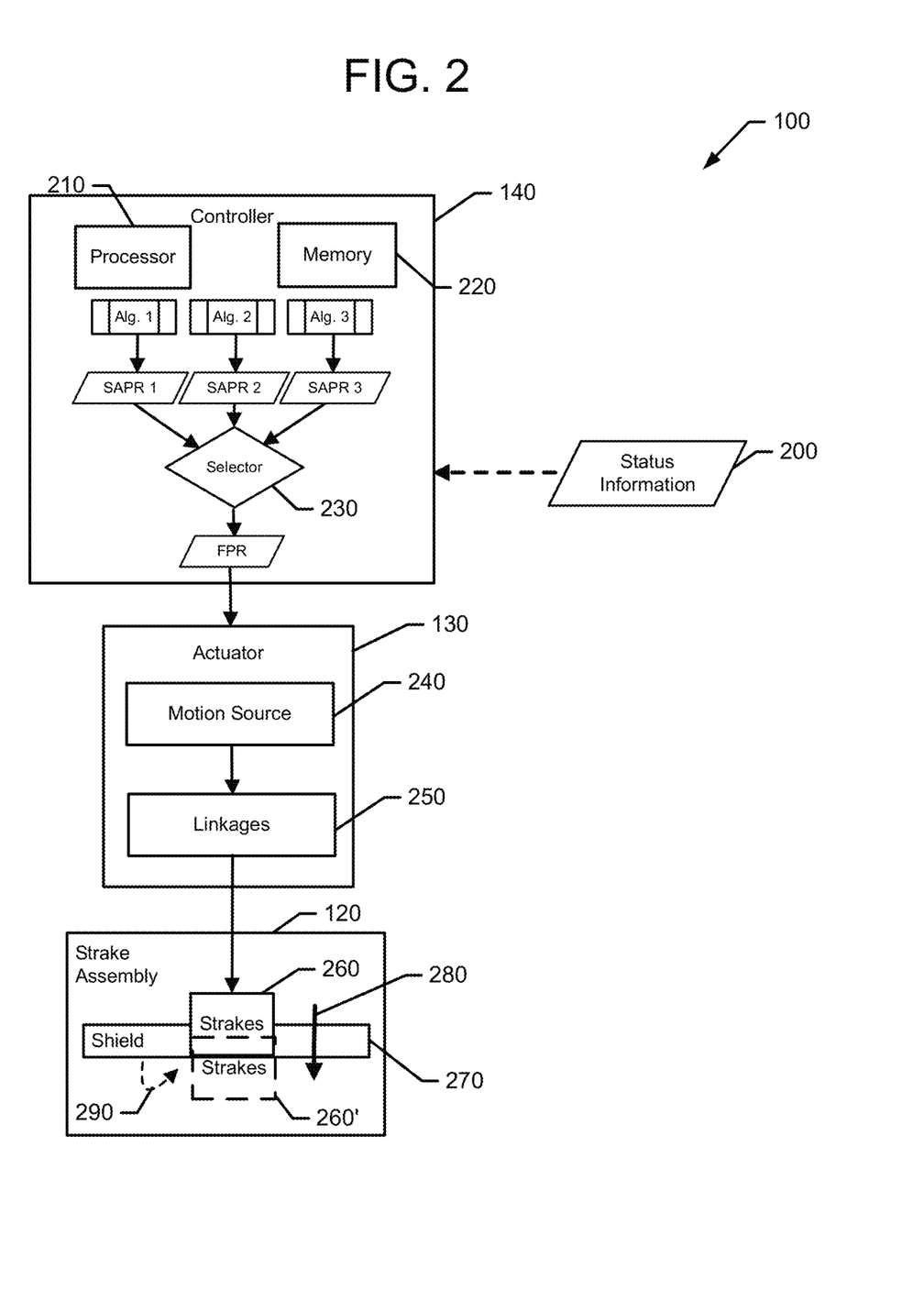
FIG. 2 illustrates a block diagram of some components of an aerodynamic control system of the vehicle control system of FIG. 1 in accordance with an example embodiment.

FIG. 2 illustrates a block diagram of various components of the aerodynamic control system 100 of one example embodiment in greater detail. In this regard, for example, the controller 140 may receive status information 200 (e.g., from the sensor network 160) via the vehicle communication bus 170. The status information 200 may include any or all of the types of information described above. Processing circuitry (e.g., a processor 210 and memory 220) at the controller 140 may process the status information 200 by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the status information 200.

The processor 210 may be configured to execute the control algorithms in series or in parallel. However, in an example embodiment, the processor 210 may be configured to execute multiple control algorithms either based on prior selection or in parallel (e.g., simultaneously). To either select which algorithm to use, or to resolve conflicts between parallel solutions, a selector 230 may be used to determine which control algorithm to employ if there are multiple different options to select between. For example, each control algorithm (e.g., Alg. 1, Alg. 2, and Alg 3 in FIG. 2) may be associated with a different mode, situation, or set of conditions. Alternatively, each of the control algorithms may be associated with a different driving style or strategy that the driver can select based on preference. In any case, a selected one or each of the control algorithms may be executed to determine a corresponding strake assembly position request (e.g., SAPR 1, SAPR 2, and SAPR 3) that informs the actuator 130 where/how to position the strake assembly 120. The processor 210 may have a speed and processing power sufficient to ensure that the status information 200 received via the vehicle communication bus 170 is both received and processed in real time (or near real time) to cause corresponding changes to be made to the actuator 130.

In some cases, one of the strake assembly position requests may be selected to be the final position request (FPR) that is communicated to the actuator 130. The selection may simply be based on which mode has been selected, and therefore which algorithm is used. However, in other cases, the processor 210 may further select a "best" SAPR for a given situation from among all parallel calculations of possible SAPRs. Regardless of how one value is selected, the final position request may be provided to the actuator 130 to drive repositioning of the strake assembly 120. The components of the actuator 130 may then physically move or operate to reposition the strake assembly 120. This repositioning could happen any suitable way, but one example is shown in FIG. 2.

In this regard, as shown in FIG. 2, the actuator 130 may include a motion source 240 (e.g., an electric motor, a hydraulic actuator, a pneumatic actuator, or the like) that is operably coupled to linkages 250 that are in turn operably coupled to strakes 260 of the strake assembly 120. Thus, for example, the linkages 250 may include mechanical structures (e.g., hinges, links, arms, rods, etc.) that operably couple motion from an output of the motion source 240 to strakes 260 (i.e., individual air guide members or elements) of the strake assembly 120.

In an example embodiment, the vehicle 110 may have an underbody shield 270, or other housing or physical structure that extends substantially parallel to the ground over which the vehicle 110 is operating. The strake assembly 120 may enable the strakes 260 to be moved with respect to the shield 270. In some cases, the strakes 260 may move upward and downward between retracted and deployed positions through the shield 270. Thus, for example, the strakes 260 may have a guillotine like motion in the direction of arrow 280 to extend from a retracted position (shown by strakes 260) to a deployed position (shown by extended strakes 260'). In other words, if the shield 270 lies in an x-y plane, the strakes 260 may move downward in the z direction (perpendicular to the x-y plane) to be repositioned to the deployed state.

In this example, the retracted position may correlate to a situation in which the strakes 260 are fully withdrawn inside the shield 270. No part of the strakes 260 may extend past or outside of the shield 270. Meanwhile, in the deployed position, the strakes 260 may extend outside the shield 270 to a full extended length. As noted above, some embodiments may have only two positions (i.e., deployed and retracted), such that the motion source 240 and linkages 250 may effectively only move the strakes 260 between two binary position choices. However, other example embodiments may have additional intermediate locations that could either be fixed or not. For unfixed intermediate locations, the strakes 260 may be continuously movable to any location between full extension and full retraction.

Additionally, although the movement of extended strakes 260' shown by arrow 280 is linear and may be in line with either or both of the movement directions of the output of the motion source 240 and the linkages 250, other constructions and movements are also possible. For example, as noted above, it may alternatively be possible for the extended strakes 260' to be retracted by folding to be adjacent to (or even flush with) the shield 270. In this regard, for example, if the linkages 250 include hinges, the extended strakes 260' may be folded as shown by dashed arrow 280 to lie in a plane substantially parallel to a plane in which the shield 270 lies (which is parallel to the ground, as noted above).

As noted above, the strakes 260 may be either integrated into or attached to an underbody shield or deflector (e.g., shield 270) that lies flat in the x-y plane. When the strakes 260 are deployed, the strakes 260 may extend through or from the shield 270 in the z direction to provide redirection of airflow in the underbody area of the vehicle 110. This redirection of airflow may, in some cases, be provided to only the front or rear wheels, but could be provided to both, and will tend to add drag and reduce lift. The addition of drag and/or reduction of lift, can be very desirable when braking or cornering in certain environments. However, for normal driving (e.g., either straight ahead or on the highway), these aerodynamic impacts may actually increase emissions and/or reduce fuel economy. Accordingly, the discussion above of modes of operation may include modes for performance driving or track driving (e.g., where the strakes 260 may be deployed), and other normal operating modes where the strakes 260 may be retracted. That said, more nuanced or sophisticated modes or operational scenarios may also be desired in some cases.

Figure 3:
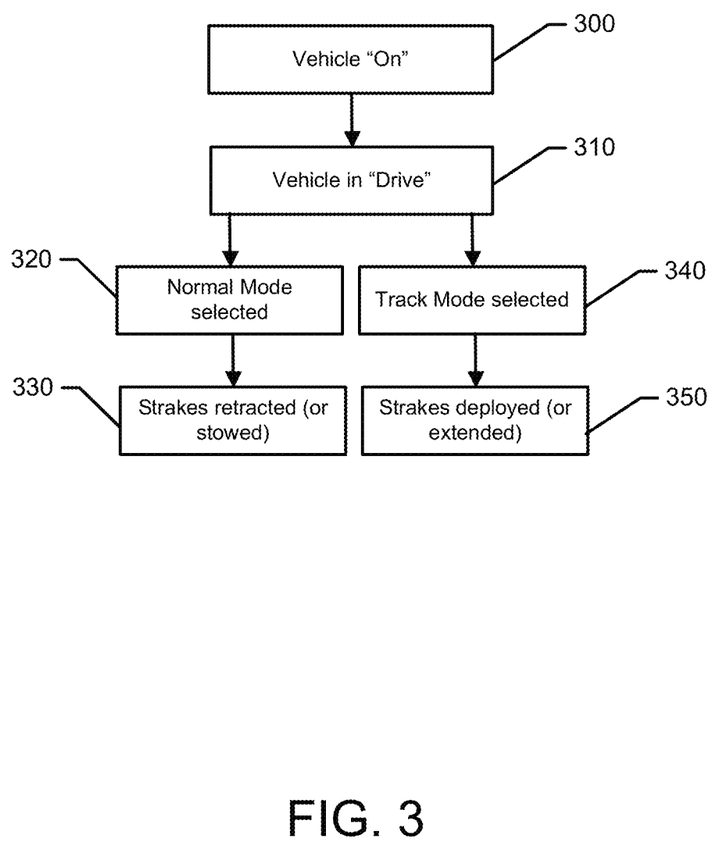
FIG. 3 illustrates a block diagram of one mode based control scheme in accordance with an example embodiment.

In this regard, for example, the selector 230 may have a normal mode and a track mode (among other possible modes). In the normal mode, the strake assembly 120 (and consequently the strakes 260) may be in the retracted state. In the track mode, the strake assembly 120 (and consequently the strakes 260) may be in the deployed state. An electrical, pneumatic or hydraulic motion source (e.g., actuator 130) is used to deploy the strakes through vehicle network communications (e.g., CAN bus 170) and may retain the strakes 260 in the state corresponding to each position for the entire time the corresponding mode is selected. FIG. 3 illustrates a block diagram of a flowchart showing a completely mode based deployment of the strakes 260.

In this regard, as shown in FIG. 3, a basic flowchart for operation of an example embodiment may include an initial operation 300 that confirms that the vehicle is on. At operation 310, the fact that the vehicle is in a drive state is also confirmed. Thereafter, the selector 230 (or a similar mode selection component) may be placed in either a normal mode or a track mode. Notably, the particular naming convention used for the modes is not important, and the names "normal" and "track" are just examples. In any case, if the normal mode is determined to be selected at operation 320, then the strakes are retracted (or stowed) at operation 330. If instead, the track mode was determined to be selected at operation 340, then the strakes may be deployed (or extended) at operation 350.

Figure 4:
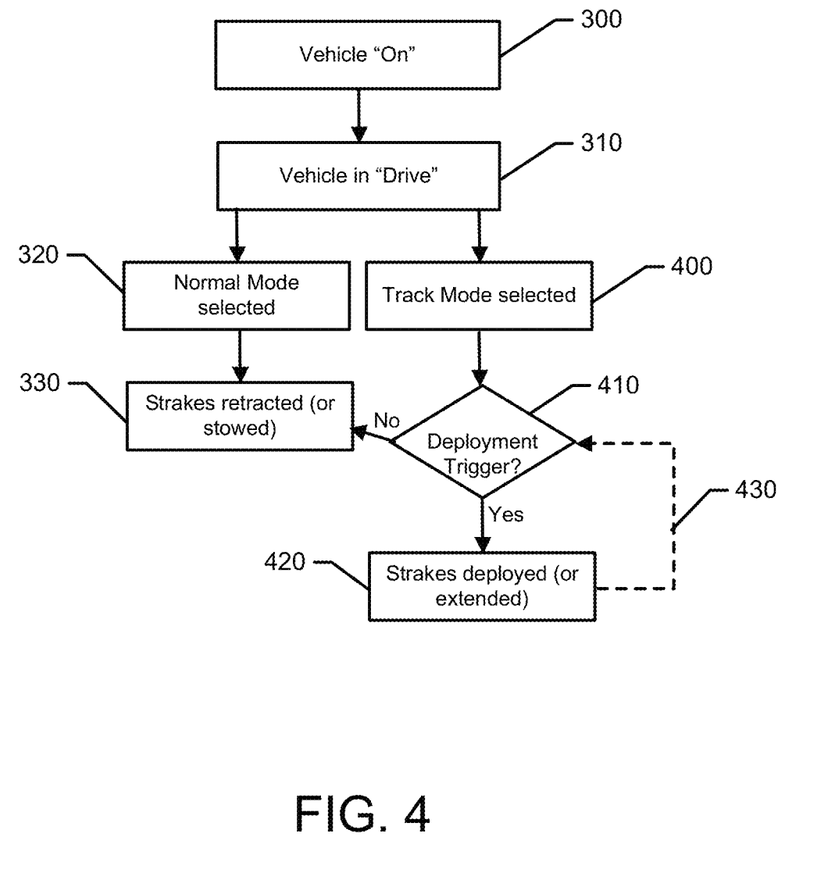
FIG. 4 illustrates a block diagram of a mode based control scheme with a normally retracted track mode in accordance with an example embodiment.
Figure 5:
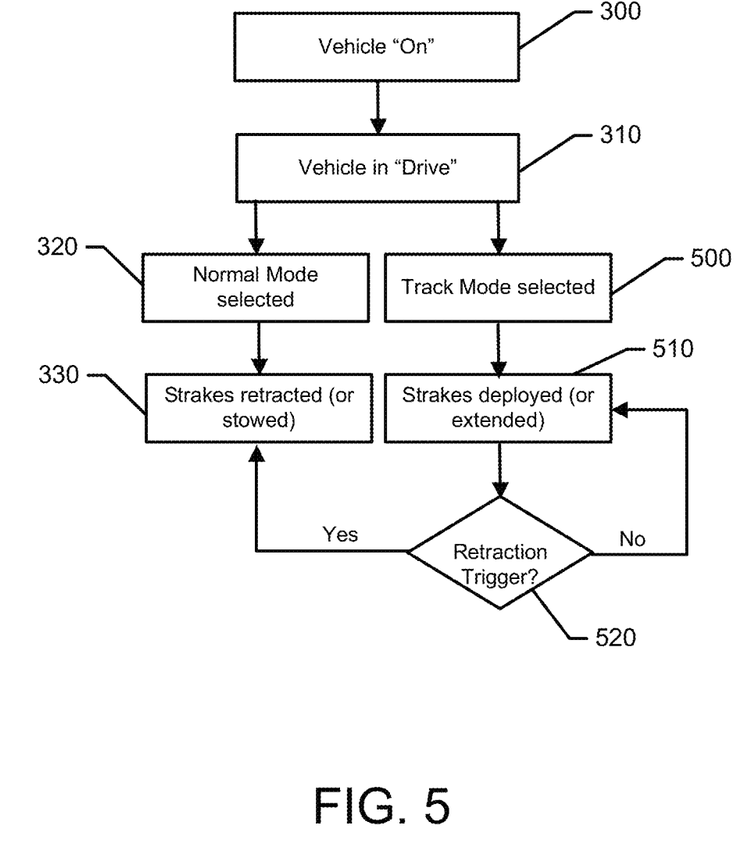
FIG. 5 illustrates a block diagram of a mode based control scheme with a normally deployed track mode in accordance with an example embodiment.

The simple example of FIG. 3 provides the driver with the ability to directly control the state of the strakes based on the mode selection made. In this regard, in one selectable mode, the strakes are deployed responsive to user selection to deploy the strakes (by selecting the mode that corresponds to strake deployment). Meanwhile, in the other selectable mode, the strakes are retracted responsive to user selection to retract the strakes (by selecting the mode that corresponds to strake deployment). Thus, it should also be appreciated that the mode names could simply correlate directly to the strake condition such that, for example, the mode names could be "deployed" and "retracted". However, other names, and other and more sophisticated modes are also possible. FIGS. 4 and 5 illustrates some examples of more sophisticated modes.

In FIG. 4, the normal mode may operate the same as described above in reference to FIG. 3. Thus, a description of the normal mode will not be repeated here. However, the track mode may be different, and will thus be described in greater detail. In this regard, selection of the track mode at operation 400 of this example may initially cause no change in the deployment state of the strakes. Instead, when in the track mode, the system (e.g., via controller 140) may detect current conditions or information (e.g., status information 200) that may be provided by the sensors of the sensor network 160. Based on the status information 200, the controller 140 of FIGS. 1 and 2 may determine whether a deployment trigger has been detected at operation 410. If the deployment trigger has been detected, then the strakes may be deployed at operation 420. If no deployment trigger is detected, then the strakes may remain retracted.

In some examples, the strakes may only remain deployed while a deployment trigger (e.g., a condition for which deployment of the strakes is desirable) is present. Thus, for example, a loop 430 (the optional nature of which is demonstrated by the fact that the loop is in dashed lines) may exist back to operation 410 for continued confirmation that the deployment trigger exists. Accordingly, when the deployment trigger is not present, the strakes will be retracted (or stowed). The loop 430 could also include a timing element (e.g., a dwell time) such that after expiry of the dwell time, the strakes are retracted. This may ensure that the strakes are only ever deployed for a period not longer than the dwell time after any particular deployment trigger is detected. Of course, detection of additional or subsequent deployment triggers may extend the time period for deployment or cause re-deployment of the strakes.

The trigger conditions could be conditions that correlate to any suitable situations or scenarios for deployment of the strakes. Thus, within the context of the example of FIG. 4, the trigger conditions may be considered to be deployment triggers. As noted above, when the strakes are deployed, increased amounts of energy are generated in the underbody area of the vehicle 110, and the increased energy will lower pressure and increase downforces on the vehicle 110. This increases drag and reduces lift, which is not desirable for straight ahead driving (due to decreased fuel efficiency), but can be helpful for cornering or braking. Thus, the deployment triggers may include status information 200 that indicates active braking or turning. In some cases, if the status information 200 indicates a brake torque request greater than a threshold amount, the threshold amount of brake torque request may be considered to be a deployment trigger. Alternatively or additionally, wheel speed, wheel/steering angle, any brake request at certain speeds and/or angles, or various other indications of cornering and/or braking may be deployment triggers. In some cases, where the sensor network 160 includes cameras or location determination equipment (e.g., GPS sensors), the fact that a curve appears in the road ahead in a camera view, or via geo-fencing based on GPS position and corresponding knowledge of the road at the location of the vehicle, may be used as a deployment trigger. A yaw sensor may detect yaw that may also act as a deployment trigger.

The example of FIG. 4 defines a normally retracted strake paradigm, where deployment occurs when the driver has specifically selected for deployment of the strakes and certain deployment triggers are met. However, a normally deployed strategy could alternatively be defined, as shown in the example of FIG. 5. In the normally deployed strategy, the strakes may be deployed responsive to driver selection of the corresponding mode, and then may be retracted responsive to detection of retraction triggers as discussed in greater detail below.

Referring now to FIG. 5, the normal mode may operate the same as described above in reference to FIGS. 3 and 4. Thus, a description of the normal mode will not be repeated here. However, the track mode may be different, and will thus be described in greater detail. In this regard, selection of the track mode at operation 500 of this example may initially cause the strakes to be deployed at operation 510. The strakes may then stay deployed until a retraction trigger is detected. Thus, at operation 520, a decision may be made as to whether a retraction trigger is detected. If the retraction trigger is detected, the strakes may be retracted at operation 330. However, for as long as not retraction trigger is detected, the strakes may remain deployed at operation 510.

The trigger conditions for retraction could be conditions that correlate to any suitable situations or scenarios for retraction of the strakes. Thus, within the context of the example of FIG. 5, the trigger conditions may include detection of high speed (straight away) driving with low wheel/steering angle. Geo-fencing or visual evidence of a straightaway ahead may also cause retraction along with timing related factors (e.g., the dwell time noted above). Geo-fencing considerations that may define retraction triggers may also include limitations related to off-road driving. For example, if the vehicle 110 is noted to have moved to a location indicating off-road driving, such location information may be seen as a retraction trigger. Cameras may also detect debris or other objects or obstructions for which retraction of the strakes would appear to be advisable. Thus, object detection in the roadway may also serve as a retraction trigger.

In some example embodiments, temperature and/or moisture related information may also serve as retraction triggers. For example, water-weighting or ice accumulation may damage the strakes, if deployed. Thus, if moisture is detected, and/or cold temperatures are detected, the detection of such phenomena may be retraction triggers. In other embodiments, a pitch sensor may detect high amounts of pitch as a retraction trigger. If the vehicle 110 is pitching significantly, the strakes could contact the ground if deployed. Of course, other retraction triggers may also be defined in alternative embodiments.

Figure 6:
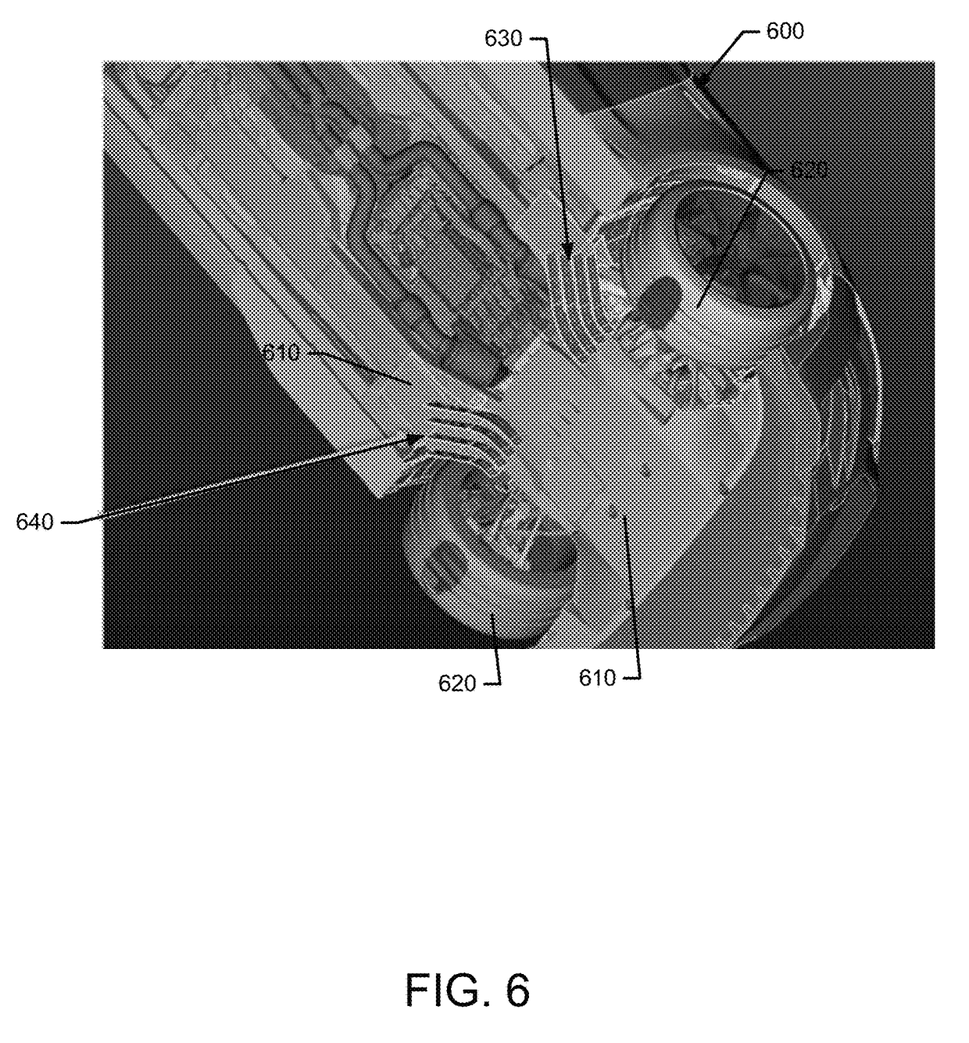
FIG. 6 illustrates an underbody area of a vehicle having a strake assembly in accordance with an example embodiment.

FIG. 6 illustrates a perspective view of an underside of a vehicle 600. The vehicle 600 includes a shield 610, which in this case is disposed below the engine of the vehicle 600. However, any underbody shield or deflector could serve as the shield 610. The vehicle 600 also includes front wheels 620. A right strake assembly 630 and a left strake assembly 640 are shown on respective sides of the vehicle 600 inside and slightly rearward of each of the front wheels 620. However, similar assemblies could alternatively or additionally be provided proximate to rear wheels of the vehicle 600. Moreover, although shown to be proximate to the back side of the wheel arch of each of the front wheels 620, other locations are also possible.

In this example each of the right strake assembly 630 and the left strake assembly 640 includes four strakes that increase in length (measured parallel to the plane of the shield 610) with each consecutive strake as distance from the longitudinal centerline of the vehicle decreases. The strakes themselves are curved in this example (although they could be straight, as shown in the example of FIG. 2). Given that these strakes are curved, hinged deployment (or folded retraction) is unlikely, and the right strake assembly 630 and the left strake assembly 640 are likely deployed via the guillotine-type deployment methods described above.

In any case, when deployed (as shown), the right strake assembly 630 and the left strake assembly 640 may each increase energy in the underbody area of the vehicle 600 to reduce lift. As noted above, this can be advantageous in certain situations such as cornering and braking, and deployment of both the right strake assembly 630 and the left strake assembly 640 at the same time may is typically the way such deployment would be expected. However, it may also be advantageous in some cases to only deploy one of the right strake assembly 630 or the left strake assembly 640 at any given time. Thus, for example, the multiple algorithms discussed above in reference to FIG. 2 could apply individually to respective individual strake assemblies to independently determine a position (e.g., deployed, stowed, 50% deployed, etc.) for each of the strake assemblies. By doing so, each individual corner of the vehicle 600 could have separately applied lift/drag calculations made for its corresponding strake assembly with more or less lift/drag being applied at each respective corner based on current conditions. The strake assemblies could then also be individually deployed and retracted to fine tune cornering capabilities and lateral stability.

Figure 7:
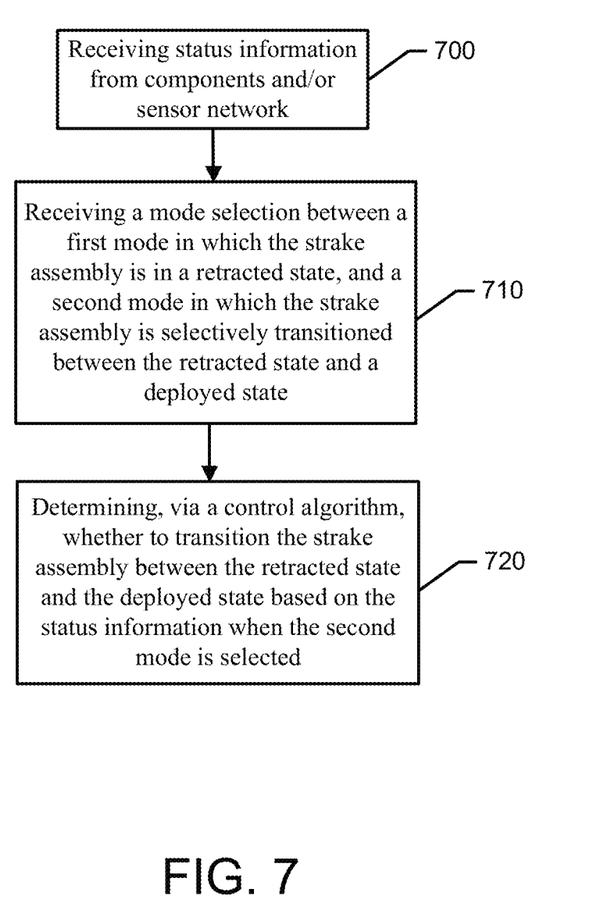
FIG. 7 illustrates a block diagram of a method of providing vehicle stability control to a vehicle having an strake assembly disposed on the vehicle in accordance with an example embodiment.

FIG. 7 illustrates a block diagram of a method of providing vehicle stability control to a vehicle having an strake assembly disposed on the vehicle is provided. The method may include receiving status information from components and/or a sensor network of the vehicle at operation 700 and receiving a mode selection between a first mode in which the strake assembly is in a retracted state, and a second mode in which the strake assembly is selectively transitioned between the retracted state and a deployed state at operation 710. The method may further include determining, via a control algorithm, whether to transition the strake assembly between the retracted state and the deployed state based on the status information when the second mode is selected at operation 720. The second mode may correspond to a normally deployed mode or a normally retracted mode, and the control algorithm may determine to retract the strake assembly from the normally deployed mode responsive to a retraction trigger, or to deploy the strake assembly from the normally retracted mode responsive to a deployment trigger.

An aerodynamics control system for a vehicle may therefore be provided in accordance with some example embodiments. The system may include an underbody shield disposed at an underside of the vehicle, a strake assembly, and an actuator. The strake assembly may include one or more deployable strakes operably coupled to the underbody shield and having a deployed state in which the one or more deployable strakes extend away from the underbody shield to increase drag and reduce lift of the vehicle. The strake assembly may also have a retracted state in which the one or more deployable strakes do not extend away from the underbody shield. The actuator may be operable by a driver of the vehicle while driving to transition the strake assembly from the retracted state to the deployed state.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the actuator may be operable based on input from a controller that receives status information from a sensor network of the vehicle. The controller may enable selection of a first mode in which the strake assembly is retained in the retracted state, and a second mode in which the controller modifies transitioning of the strake assembly between the deployed state and the retracted state based on the status information. In an example embodiment, the controller may define a normally deployed paradigm for the strake assembly in the second mode, and the controller may transition the strake assembly to the retracted state when the status information includes a retraction trigger. In some examples, the retraction trigger may include a location-based limitation on the strake assembly being in the deployed state, and the controller may determine, based on vehicle location, that the location-based limitation is met. In an example embodiment, the retraction trigger may include a temperature or moisture-based limitation on the strake assembly being in the deployed state, and the controller may determine, based on the status information, that the temperature or moisture-based limitation is met. In some examples, the retraction trigger may include a speed or turning angle-based limitation on the strake assembly being in the deployed state, and the controller may determine, based on the status information, that the speed or turning angle-based limitation is met. In an example embodiment, the controller may define a normally retracted paradigm for the strake assembly in the second mode, and the controller may transition the strake assembly to the deployed state when the status information includes a deployment trigger. In some examples, the deployment trigger may include a location-based trigger for the strake assembly to be in the deployed state, and the controller may determine, based on vehicle location, that the location-based trigger is met. In an example embodiment, the deployment trigger may include a braking trigger, and the controller may determine, based on a brake pressure request of the status information, whether the braking trigger is met. In some examples, the deployment trigger may include a turning trigger, and the controller may determine, based on turning angle of the vehicle from the status information, whether the turning trigger is met. In an example embodiment, responsive to transitioning to the deployed state, a dwell timer is started, and the controller may transition the strake assembly to the retracted state when the dwell timer expires. In some examples, the strake assembly may include a first strake assembly disposed proximate to one side of the vehicle and a second strake assembly disposed proximate to an opposing side of the vehicle. Each of the first and second strake assemblies may be independently operable to transition between the deployed state and the retracted state based on a control algorithm executed by the controller. In an example embodiment, the actuator may include a pneumatic, hydraulic or electrical motion source operably coupled to the one or more deployable strakes via corresponding linkages. In some examples, the one or more deployable strakes may extend linearly through the underbody shield to transition to the deployed state, or the one or more deployable strakes may fold to transition between the deployed state and the retracted state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although That which is claimed:

1. An aerodynamics control system for a vehicle, the system comprising:
   an underbody shield disposed at an underside of the vehicle;
   a strake assembly comprising one or more deployable strakes operably coupled to the underbody shield and having a deployed state in which the one or more deployable strakes extend away from the underbody shield to increase drag and reduce lift of the vehicle, and having a retracted state in which the one or more deployable strakes do not extend away from the underbody shield; and
   an actuator operable by a driver of the vehicle while driving to transition the strake assembly from the retracted state to the deployed state,
   wherein the one or more deployable strakes extend linearly through the underbody shield to transition to the deployed state.

2. The system of claim 1, wherein the actuator is operable based on input from a controller,
   wherein the controller receives status information from a sensor network of the vehicle, and
   wherein the controller enables selection of a first mode in which the strake assembly is retained in the retracted state, and a second mode in which the controller modifies transitioning of the strake assembly between the deployed state and the retracted state based on the status information.

3. The system of claim 2, wherein the controller defines a normally deployed paradigm for the strake assembly in the second mode, and
   wherein the controller transitions the strake assembly to the retracted state when the status information includes a retraction trigger.

4. The system of claim 3, wherein the retraction trigger comprises a location-based limitation on the strake assembly being in the deployed state, and
   wherein the controller determines, based on vehicle location, that the location-based limitation is met.

5. The system of claim 3, wherein the retraction trigger comprises a temperature or moisture-based limitation on the strake assembly being in the deployed state, and
   wherein the controller determines, based on the status information, that the temperature or moisture-based limitation is met.

6. The system of claim 3, wherein the retraction trigger comprises a speed or turning angle-based limitation on the strake assembly being in the deployed state, and
   wherein the controller determines, based on the status information, that the speed or turning angle-based limitation is met.

7. The system of claim 2, wherein the controller defines a normally retracted paradigm for the strake assembly in the second mode, and
   wherein the controller transitions the strake assembly to the deployed state when the status information includes a deployment trigger.

8. The system of claim 7, wherein the deployment trigger comprises a location-based trigger for the strake assembly to be in the deployed state, and
   wherein the controller determines, based on vehicle location, that the location-based trigger is met.

9. The system of claim 7, wherein the deployment trigger comprises a braking trigger, and
   wherein the controller determines, based on a brake pressure request of the status information, whether the braking trigger is met.

10. The system of claim 7, wherein the deployment trigger comprises a turning trigger, and
    wherein the controller determines, based on turning angle of the vehicle from the status information, whether the turning trigger is met.

11. The system of claim 2, wherein responsive to transitioning to the deployed state, a dwell timer is started, and
    wherein the controller transitions the strake assembly to the retracted state when the dwell timer expires.

12. The system of claim 2, wherein the strake assembly comprises a first strake assembly disposed proximate to one side of the vehicle and a second strake assembly disposed proximate to an opposing side of the vehicle, and
    wherein each of the first and second strake assemblies is independently operable to transition between the deployed state and the retracted state based on a control algorithm executed by the controller.

13. The system of claim 1, wherein the actuator comprises a pneumatic, hydraulic or electrical motion source operably coupled to the one or more deployable strakes via corresponding linkages.

14. The system of claim 1,
    wherein the one or more deployable strakes fold to transition between the deployed state and the retracted state.

15. A method of providing vehicle stability control to a vehicle having a strake assembly disposed on the vehicle, the method comprising:
    receiving status information from components or a sensor network of the vehicle;
    receiving a mode selection between a first mode in which the strake assembly is in a retracted state, and a second mode in which the strake assembly is selectively transitioned between the retracted state and a deployed state; and
    determining, via a control algorithm, whether to transition the strake assembly between the retracted state and the deployed state based on the status information when the second mode is selected,
    wherein the second mode corresponds to a normally deployed mode or a normally retracted mode, and the control algorithm determines to retract the strake assembly from the normally deployed mode responsive to a retraction trigger, or to deploy the strake assembly from the normally retracted mode responsive to a deployment trigger, and
    wherein the strake assembly includes one or more deployable strakes that extend linearly through an underbody shield of the vehicle to transition to the deployed state.

16. The method of claim 15, wherein the deployment trigger or the retraction trigger comprises a location-based trigger.

17. The method of claim 15, wherein the deployment trigger or the retraction trigger comprises a braking trigger.

18. The method of claim 15, wherein the deployment trigger or the retraction trigger comprises a turning trigger.

19. The method of claim 15, wherein the strake assembly comprises a first strake assembly disposed proximate to one side of the vehicle and a second strake assembly disposed proximate to an opposing side of the vehicle, and
    wherein determining whether to transition comprises determining separately for each of the first and second strake assemblies whether to transition between the deployed state and the retracted state independently based on the control algorithm executed by the controller.

20. The method of claim 15,
wherein the one or more deployable strakes fold to transition between the deployed state and the retracted state.

\* \* \* \* \*